United States Patent
Leszko et al.

(10) Patent No.: US 12,514,505 B2
(45) Date of Patent: Jan. 6, 2026

(54) HERMETIC ENCLOSURE FOR IMPLANTABLE SENSORS

(71) Applicant: DePuy Synthes Products, Inc., Raynham, MA (US)

(72) Inventors: Filip Leszko, West Chester, PA (US); Jochen Walser, Bern (CH); George Mikhail, Downingtown, PA (US)

(73) Assignee: DePuy Synthes Products, Inc., Raynham, MA (US)

( * ) Notice: Subject to any disclaimer, the term of this patent is extended or adjusted under 35 U.S.C. 154(b) by 1513 days.

(21) Appl. No.: 17/007,273

(22) Filed: Aug. 31, 2020

(65) Prior Publication Data

US 2022/0061760 A1 Mar. 3, 2022

(51) Int. Cl.
| A61B 5/00 | (2006.01) |
| A61B 5/01 | (2006.01) |
| A61B 5/05 | (2021.01) |
| A61B 5/0538 | (2021.01) |
| A61B 5/145 | (2006.01) |
| A61F 2/38 | (2006.01) |

(52) U.S. Cl.
CPC ............ *A61B 5/686* (2013.01); *A61B 5/0031* (2013.01); *A61B 5/0084* (2013.01); *A61B 5/01* (2013.01); *A61B 5/05* (2013.01); *A61B 5/0538* (2013.01); *A61B 5/14503* (2013.01); *A61B 5/14539* (2013.01); *A61F 2/3859* (2013.01); *A61B 2562/0247* (2013.01); *A61B 2562/0252* (2013.01); *A61B 2562/0261* (2013.01); *A61B 2562/12* (2013.01); *A61B 2562/16* (2013.01)

(58) Field of Classification Search
CPC ... A61F 2/28; A61F 2/30; A61B 5/103; A61B 5/686; A61B 5/6878; A61B 5/0031
See application file for complete search history.

(56) References Cited

U.S. PATENT DOCUMENTS

| 5,873,843 A | 2/1999 | Draper |
| 6,034,296 A | 3/2000 | Elvin et al. |
| 6,143,035 A | 11/2000 | McDowell |
| 6,447,448 B1 | 9/2002 | Ishikawa et al. |
| 6,456,076 B1 | 9/2002 | Joseph |
| 6,610,096 B2 | 8/2003 | MacDonald |
| 6,706,005 B2 | 3/2004 | Roy et al. |
| 6,796,187 B2 | 9/2004 | Srinivasan et al. |
| 7,182,736 B2 | 2/2007 | Roy et al. |
| 7,245,117 B1 | 7/2007 | Joy et al. |

(Continued)

FOREIGN PATENT DOCUMENTS

| EP | 1251357 A1 | 10/2002 |
| RU | 2442964 C1 | 2/2012 |

(Continued)

*Primary Examiner* — William H Matthews
(74) *Attorney, Agent, or Firm* — BakerHostetler

(57) ABSTRACT

In one example, an anatomical implant has an implant body and a rim. The implant body has an outer surface, and the rim extends from the implant body along an outward direction. The rim has an internal surface, and an external surface opposite the internal surface. The internal surface defines a pocket that can support a sensor therein. In another example, a system comprises the anatomical implant, the sensor, and a cap, where the cap is attached to the rim such that the sensor is hermetically sealed within the pocket.

19 Claims, 6 Drawing Sheets

(56) References Cited

U.S. PATENT DOCUMENTS

| | | |
|---|---|---|
| 7,256,695 B2 | 8/2007 | Hamel et al. |
| 7,302,858 B2 | 12/2007 | Walsh et al. |
| 7,357,037 B2 | 4/2008 | Hnat et al. |
| 7,432,723 B2 | 10/2008 | Ellis et al. |
| 7,439,723 B2 | 10/2008 | Allen et al. |
| 7,466,120 B2 | 12/2008 | Miller et al. |
| 7,478,108 B2 | 1/2009 | Townsend et al. |
| 7,491,179 B2 | 2/2009 | Roy et al. |
| 7,498,799 B2 | 3/2009 | Allen et al. |
| 7,509,870 B2 | 3/2009 | Aebersold et al. |
| 7,550,978 B2 | 6/2009 | Joy et al. |
| 7,679,355 B2 | 3/2010 | Allen et al. |
| 7,786,867 B2 | 8/2010 | Hamel et al. |
| 7,839,153 B2 | 11/2010 | Joy et al. |
| 7,854,174 B2 | 12/2010 | Aebersold et al. |
| 7,878,988 B2 | 2/2011 | Bush et al. |
| 7,932,732 B2 | 4/2011 | Ellis et al. |
| 7,936,174 B2 | 5/2011 | Ellis et al. |
| 7,970,734 B2 | 6/2011 | Townsend et al. |
| 7,973,540 B2 | 7/2011 | Kroh et al. |
| 8,026,729 B2 | 9/2011 | Kroh et al. |
| 8,032,486 B2 | 10/2011 | Townsend et al. |
| 8,043,290 B2 | 10/2011 | Harrison et al. |
| 8,066,650 B2 | 11/2011 | Lee et al. |
| 8,070,695 B2 | 12/2011 | Gupta et al. |
| 8,083,741 B2 | 12/2011 | Morgan et al. |
| 8,237,451 B2 | 8/2012 | Joy et al. |
| 8,264,240 B2 | 9/2012 | Park et al. |
| 8,278,941 B2 | 10/2012 | Kroh et al. |
| 8,343,153 B2 | 1/2013 | Duda et al. |
| 8,486,070 B2 | 7/2013 | Morgan et al. |
| 8,516,884 B2 | 8/2013 | Stein et al. |
| 8,529,474 B2 | 9/2013 | Gupta et al. |
| 8,551,092 B2 | 10/2013 | Morgan et al. |
| 8,622,936 B2 | 1/2014 | Schenberger et al. |
| 8,687,865 B2 | 4/2014 | Wilson et al. |
| 8,721,570 B2 | 5/2014 | Gupta et al. |
| 8,721,643 B2 | 5/2014 | Morgan et al. |
| 8,896,324 B2 | 11/2014 | Kroh et al. |
| 8,926,674 B2 | 1/2015 | Wolter et al. |
| 9,041,416 B2 | 5/2015 | Park et al. |
| 9,060,743 B2 | 6/2015 | Munro et al. |
| 9,326,728 B2 | 5/2016 | Demir et al. |
| 9,510,785 B2 | 12/2016 | Munro et al. |
| RE46,582 E | 10/2017 | Morgan et al. |
| 9,795,423 B2 | 10/2017 | Deirmengian et al. |
| 2003/0030451 A1 | 2/2003 | Braun |
| 2004/0011137 A1 | 1/2004 | Hnat et al. |
| 2010/0094306 A1 | 4/2010 | Chang et al. |
| 2010/0282617 A1* | 11/2010 | Rothberg ........... G01N 27/4148 |
| | | 205/780.5 |
| 2010/0331737 A1* | 12/2010 | Stein .................... A61B 5/6878 |
| | | 600/587 |
| 2011/0098603 A1 | 4/2011 | Deirmengian et al. |
| 2011/0307060 A1 | 12/2011 | Lozier et al. |
| 2012/0035468 A1* | 2/2012 | Ritchey ................... A61B 5/05 |
| | | 600/424 |
| 2012/0190989 A1 | 7/2012 | Kaiser et al. |
| 2012/0191989 A1 | 7/2012 | Michishita |
| 2012/0253345 A1 | 10/2012 | Wixted |
| 2013/0079672 A1 | 3/2013 | Stein et al. |
| 2013/0190654 A1 | 7/2013 | Deirmengian et al. |
| 2013/0226034 A1 | 8/2013 | Stein et al. |
| 2014/0081121 A1* | 3/2014 | Wilhelm ................ A61B 5/062 |
| | | 600/409 |
| 2014/0084943 A1 | 3/2014 | Kroh et al. |
| 2014/0378783 A1 | 12/2014 | Ledet et al. |
| 2015/0036784 A1 | 2/2015 | Qing et al. |
| 2015/0083796 A1 | 3/2015 | Kyung et al. |
| 2015/0255995 A1 | 9/2015 | Park et al. |
| 2015/0257799 A1 | 9/2015 | Janna et al. |
| 2015/0289796 A1 | 10/2015 | Deirmengian et al. |
| 2015/0327896 A1 | 11/2015 | Bottlang et al. |
| 2016/0066803 A1* | 3/2016 | Hu ........................... A61B 5/72 |
| | | 600/561 |
| 2016/0128573 A1 | 5/2016 | Wilder et al. |
| 2016/0169578 A1 | 6/2016 | Joseph |
| 2016/0172806 A1 | 6/2016 | Bilodeau et al. |
| 2016/0198981 A1 | 7/2016 | Demir et al. |
| 2016/0213319 A1 | 7/2016 | Ogrodnik et al. |
| 2016/0354174 A1 | 12/2016 | Demir |
| 2017/0182325 A1 | 6/2017 | Wu |
| 2018/0000527 A1 | 1/2018 | Deirmengian et al. |
| 2018/0055444 A1 | 3/2018 | Windolf |
| 2019/0038214 A1 | 2/2019 | Mikhail et al. |
| 2019/0200928 A1 | 7/2019 | Rowland et al. |

FOREIGN PATENT DOCUMENTS

| | | |
|---|---|---|
| WO | 2005/067796 A1 | 7/2005 |
| WO | 2007/025191 A1 | 3/2007 |
| WO | 2016/122148 A1 | 8/2016 |
| WO | 2020/066094 A1 | 4/2020 |

* cited by examiner

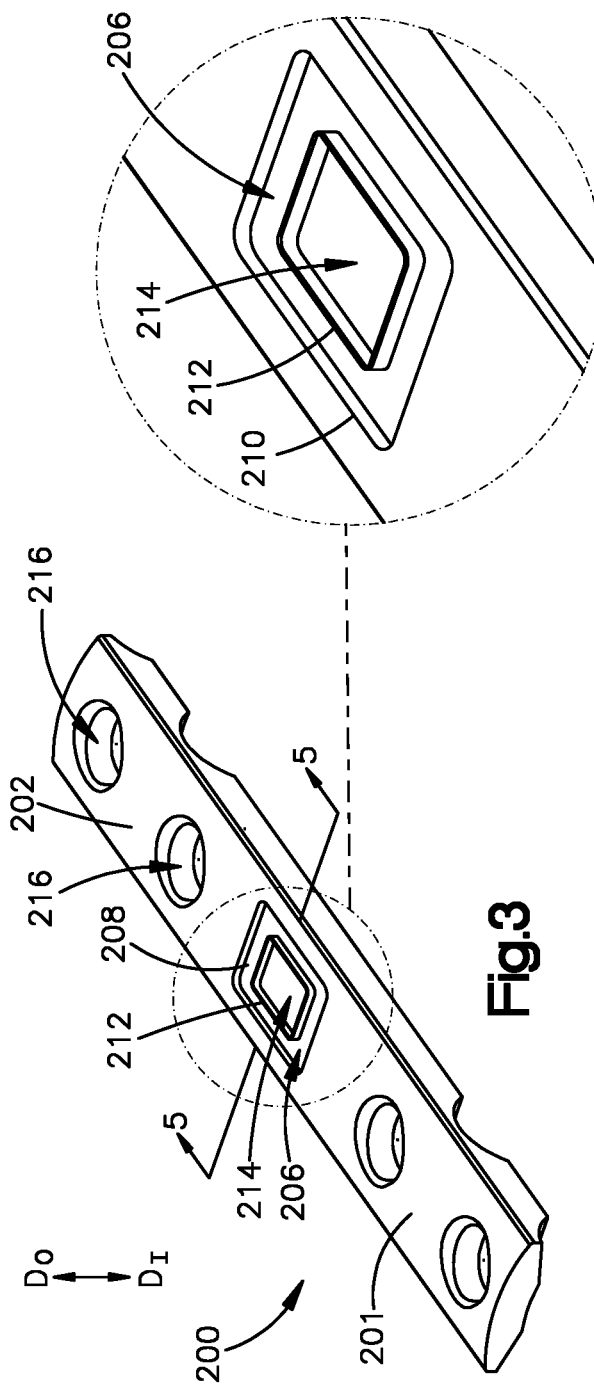
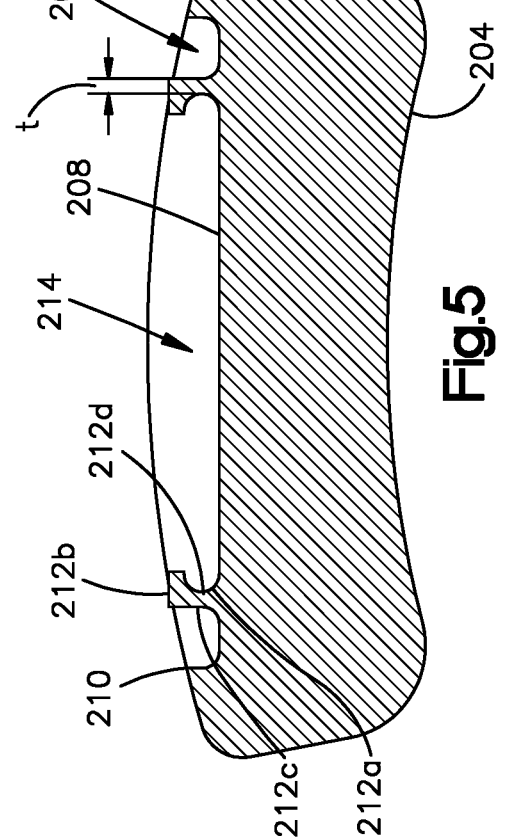
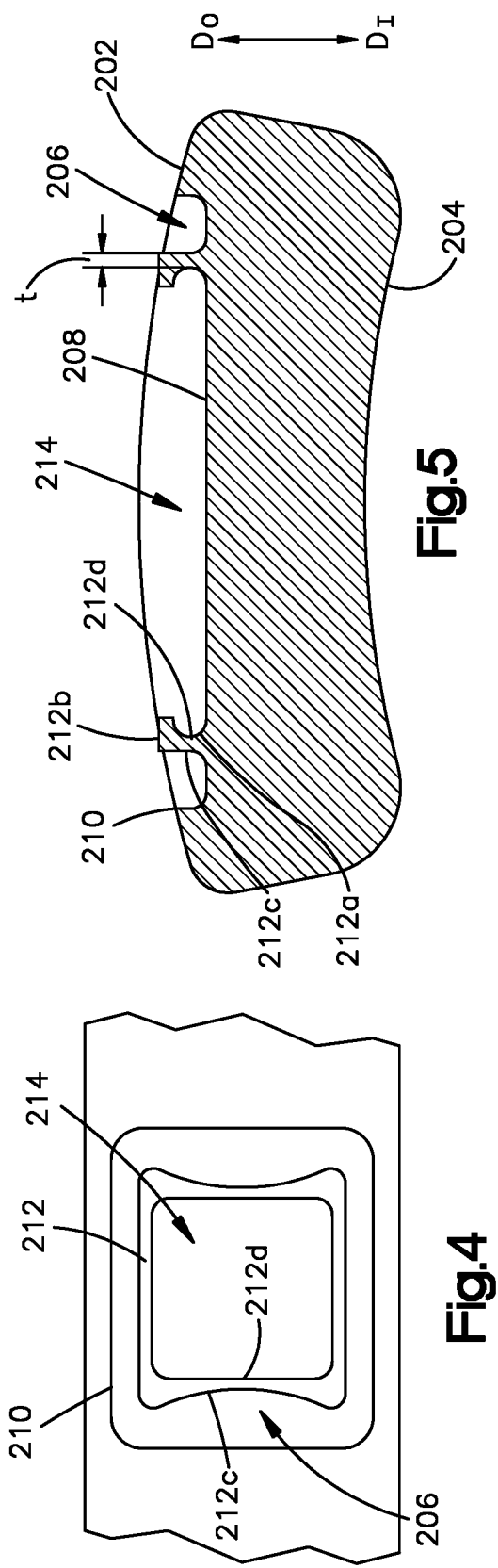

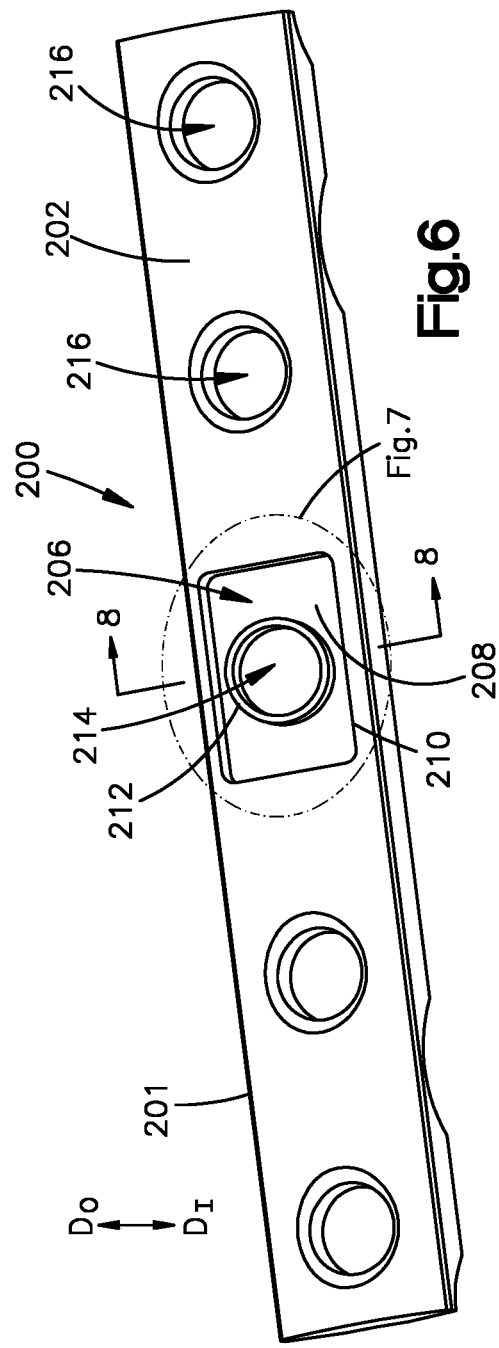
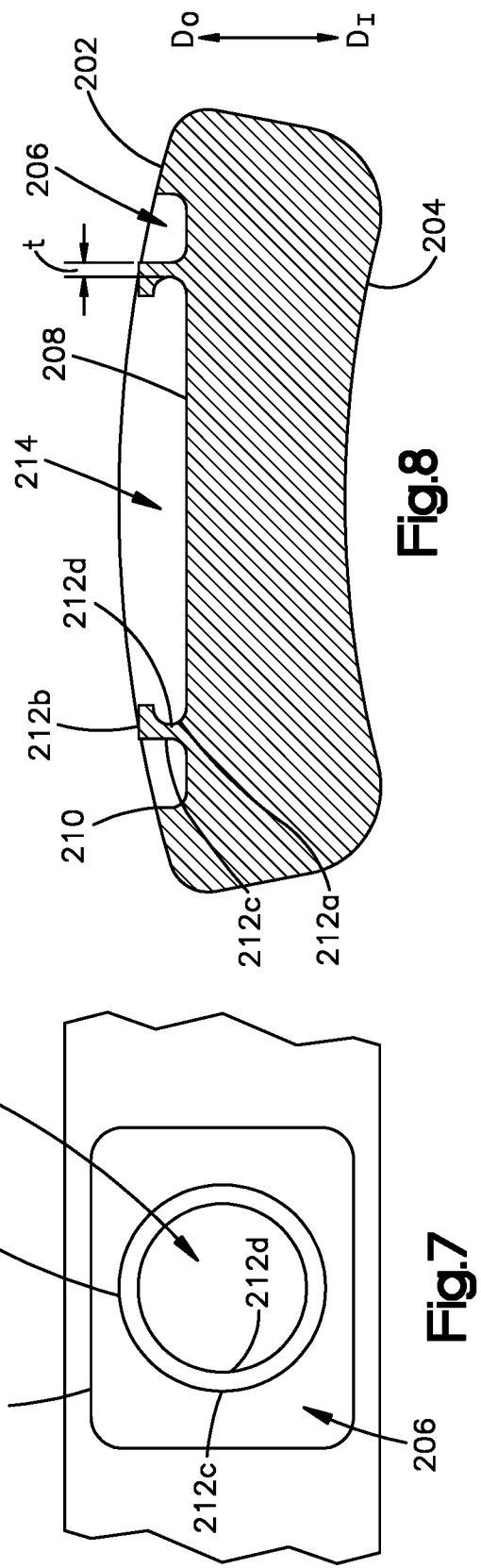

HERMETIC ENCLOSURE FOR IMPLANTABLE SENSORS

TECHNICAL FIELD

The present invention relates to sensors that are implantable into a patient's body, and to systems and methods of using the same.

BACKGROUND

Tracking of physical disease and healing in humans often involves measuring anatomical properties of a patient's body. However, some measurements, such as those that can only be obtained internally, can be difficult to obtain. More recently, there has been an interest in sensors that can be implanted into a patient's body to track the health of the patient over time. For example, attempts have been made to use one or more strain gauges to track healing in a damaged or fractured bone. The one or more strain gauges are attached to an orthopedic implant that is in turn attached to the damaged or fractured bone. As the bone heals, the bone increasingly shares the load imparted by the patient's body on the orthopedic implant. Thus, the load imparted on the bone increases as the bone heals, while the load imparted on the orthopedic implant decreases. In principle, this change in loading can be measured over time by the one or more strain gauges to track the progress of healing in the bone. The measurement can then be communicated to a device outside of the body that can be accessed by a physician.

SUMMARY

In one example, an anatomical implant comprises an implant body and a rim. The implant body has an outer surface, and the rim extends from the implant body along an outward direction. The rim has an internal surface, and an external surface opposite the internal surface. The internal surface defines a pocket that can support a sensor therein.

In another example, a system comprises the anatomical implant, the sensor, and a cap, where the cap is attached to the rim such that the sensor is hermetically sealed within the pocket.

In yet another example, a method comprises a step of receiving a sensor within a pocket defined in an anatomical implant, where the anatomical implant includes a rim having an internal surface, and an external surface opposite the internal surface, the internal surface defining the pocket. The method comprises a step of aligning a cap with an end of the rim, and a step of attaching the cap to the rim so as to hermetically seal the sensor within the pocket.

BRIEF DESCRIPTION OF THE DRAWINGS

The foregoing summary, as well as the following detailed description of embodiments of the application, will be better understood when read in conjunction with the appended drawings. For the purposes of illustrating the methods and bone screws of the present application, there is shown in the drawings representative embodiments. It should be understood, however, that the application is not limited to the precise methods and devices shown. In the drawings:

FIG. 3 shows a perspective view of an anatomical implant according to one example, the implant having a rectangular-shaped rim that is configured to support a sensor therein;

FIG. 4 shows a top view of a portion of the anatomical implant of FIG. 3;

FIG. 5 shows a cross-sectional view of the anatomical implant of FIG. 3;

FIG. 6 shows a perspective view of an anatomical implant according to another example, the implant having a circular-shaped rim that is configured to support a sensor therein;

FIG. 7 shows a top view of a portion of the anatomical implant of FIG. 6;

FIG. 8 shows a cross-sectional view of the anatomical implant of FIG. 6;

DETAILED DESCRIPTION

Electronic sensors that are implanted into a patient's body can contain non-biocompatible materials. As a result, the non-biocompatible materials of the sensors should be isolated from contact with the body such that only biocompatible materials are in contact with the body. To limit contact between non-biocompatible sensor materials and the body, an implantable sensor can be hermetically sealed within a biocompatible housing. Typically, truly hermetic enclosures are made of either glass, ceramic, or metal. An integral element of the sensor systems is an antenna that allows radiofrequency (RF) communication of the data with the outside reader. However, metal enclosures can disrupt the RF field and render the communication ineffective. Glass and ceramics, on the other hand, do not create a barrier for RF energy, and therefore, are preferable for use in hermetically sealing an implantable sensor. Depending on the application, some sensors, such as those with strain sensing elements, may require direct contact with the metallic implant. In such case, the glass or ceramic enclosure should be integrated with the metallic implant. For example, ceramic caps can be laser-welded to a metal anatomical implant. However, the heat generated at the weld can compromise the mechanical properties of the metal implant and lead to premature fatigue failures.

As will be discussed below, in various examples, an anatomical implant can be implemented with a metal rim that defines a pocket therein. The pocket is configured to support the sensing elements of the sensor therein, and may also support other elements therein that are to be hermetically sealed, such as a PCB, an antenna, a battery, etc. A non-metallic cap, such as a ceramic cap, that allows for RF communication can be laser-welded onto the metal rim, hermetically sealing the contents within the pocket. Excessive heat generated during the welding process can be absorbed by the rim, thereby protecting the underlying core structure of the metal implant.

Figure 1:
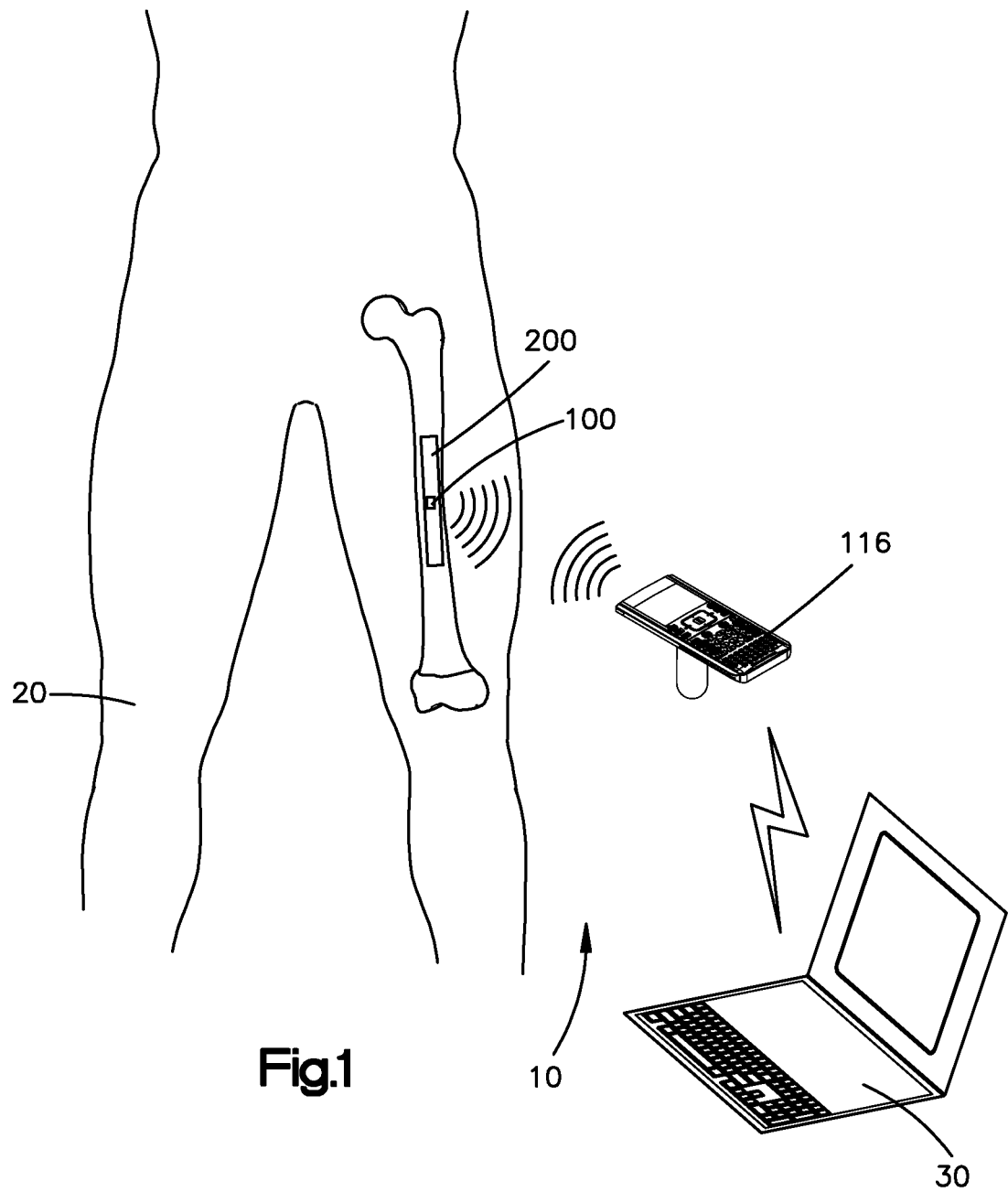
FIG. 1 shows a simplified schematic diagram of a measurement system according to one example that is positioned relative to a patient so as to measure an anatomical condition of the patient, the system having a sensor supported by an anatomical implant and having an external reader that receives measurements from the sensor.

Referring to FIG. 1, a system 10 is shown that is configured to track health of a patient over time. In general, the system 10 comprises at least one implantable sensor 100 that is configured to be implanted into a patient's body 20. The system can also comprise an anatomical implant 200 configured to support the at least one sensor 100. The anatomical implant 200 can be any suitable anatomical implant such as (without limitation) a bone plate, an intramedullary nail, a bone anchor, a pedicle screw, a spine rod, an intervertebral implant, and so on. In addition, the bone plate can be formed from a metal such as titanium, although in alternative examples, the bone plate can be formed from another suitable implantable material such as, without limitation, a polymer such as polyether ether ketone (PEEK).

The system can further comprise an external wireless reader 116 configured to wirelessly receive data from the at least one sensor 100 through the skin of the patient when the external wireless reader 116 is situated outside of the patient's body. The data can then be communicated to a computing device 30 that can be accessed by the patient or a medical professional. The computing device 30 can be physically separate from the external wireless reader 116 as shown or can be implemented as part of the external wireless reader 116. In some examples, the external wireless reader 116 can be configured to wirelessly provide a source of power to the at least one sensor 100, while in other examples, the at least one sensor 100 can comprise its own source of power, such as (without limitation) a battery.

Figure 2:
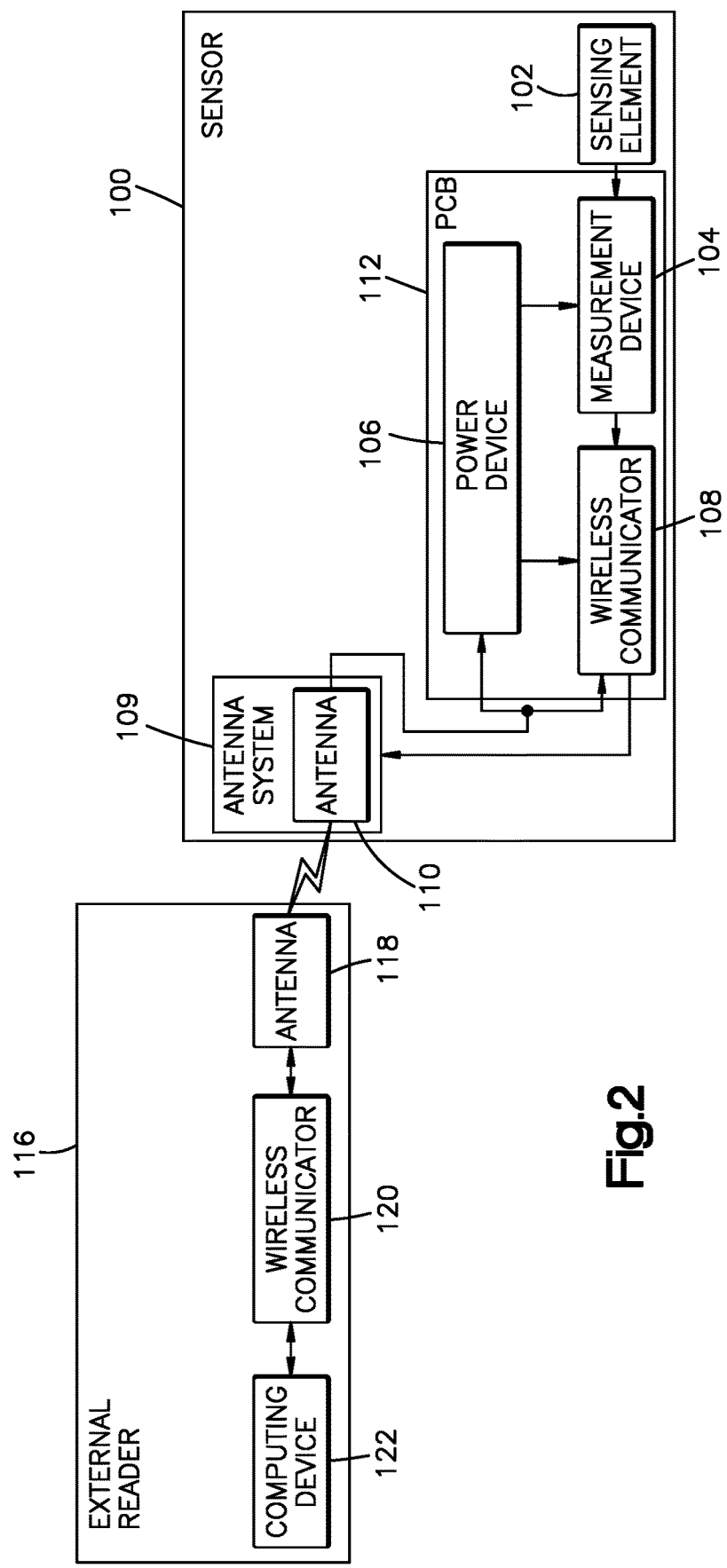
FIG. 2 shows a simplified block diagram of the system of FIG. 1 according to one example.

Referring now to FIG. 2, a simplified block diagram of the system of FIG. 1 is shown according to one embodiment. The system comprises a sensor 100 that comprises at least one sensing element 102, and a measurement device 104 in communication with the at least one sensing element 102. Together, the at least one sensing element 102 and measurement device 104 are configured to generate a measurement value that is proportional to a value of an anatomical property that a patient's body observed by the at least one sensing element 102 when the sensor 100 is implanted in the patient's body. The anatomical property can be any suitable property for tracking the health of a patient such as (without limitation) strain, load, deflection, rotation, temperature, pressure, pH level, oxygen level, and so on.

To generate the measurement value, each sensing element 102 has a sensor property having a value that changes in response to a change in a value of the anatomical property observed by the sensing element 102. Thus, each sensing element 102 has a sensor property having a value that is proportional to the value of the anatomical property. For example, the sensor property can be resistance, capacitance, inductance, piezoelectricity, light behavior, or another suitable sensor property. The measurement device 104 is configured to detect or measure the value of the sensor property, and the value of the anatomical property can be calculated from the value of the sensor property. In some embodiments, the value of the anatomical property can be calculated by multiplying the measured value of the sensor property by a constant.

Each sensing element 102 can be any suitable type of sensing element for tracking the health of a patient, and the sensor property can be any suitable sensor property. For example, the sensing element can be (without limitation) at least one of a resistive sensing element having a resistance that changes in response to a change in the anatomical property, a piezoelectric sensing element having a piezoelectric material that changes an electrical charge in response to a change in the anatomical property, a capacitive sensing element having a capacitance that changes in response to a change in the anatomical property, an inductive sensing element having an inductance that changes in response to a change in the anatomical property, an optical sensing element, and so on. In one example, each sensing element 102 can be a resistive sensing element, the sensor property of each sensing element 102 can be an electrical resistance of the sensing element 102, and the anatomical property can be strain on the anatomical body, where the resistance of each sensing element 102 changes in response to a change in strain on the anatomical body.

The sensor 100 can comprise an internal wireless communicator 108 in communication with the measurement device 104, and an antenna system 109 in communication with the internal wireless communicator 108. The antenna system 109 can include an antenna 110, and optionally can include other components such as a shield that limits the amount in which the implant 200 beneath the shield is exposed to the magnetic field generated by the antenna 110, or prevent such exposure altogether. The internal wireless communicator 108 is configured to receive the measurement value from the measurement device 104 and provide the measurement value to the antenna 110 in a suitable form for wireless transmission. The internal wireless communicator 108 can include a wireless transmitter or transponder that receives the measurement value from the measurement device 104 and prepares the measurement value for wireless transmission. For example, the wireless communicator 108 can include processing such as (without limitation) one or more of (i) memory configured to store the measurement value, (ii) a digital-to-analog converter configured to convert the measurement value to analog format, (iii) a radio-frequency (RF) modulator configured to modulate the measurement value, (iv) an error-correction encoder configured to encode the measurement value, and other processing consistent with the wireless technology employed by the sensor 100.

In one example, the internal wireless communicator 108 can be configured as a passive radio-frequency identification (RFID) transponder. Alternatively, the internal wireless communicator can be configured using any other wireless communication technology suitable for communicating through the skin such as (without limitation) battery-assisted passive RFID, active RFID, Bluetooth, and Wi-Fi. The wireless communicator 108 can further include a unique identifier (ID) that can be used to distinguish the sensor 100 from other sensors. In one example, the unique ID can be an ID of an RFID tag. The antenna 110 is configured to convert an electrical signal corresponding to the measurement value from the wireless communicator 108 into radio waves so as to transmit the measurement value wirelessly through the patient's skin to the external wireless reader 116 situated outside of the patient's body.

The sensor 100 can comprise a power device 106 configured to supply power to the measurement device 104 and wireless communicator 108. In at least some examples, the power device 106 can include an energy harvesting device configured to capture energy from a suitable energy source that is separate from the sensor 100. For example, the energy source can be radio waves communicated from the external wireless reader 116. Alternatively, the power device 106 can capture energy from the patient's body itself or from another external source such as a source external to the patient's body. For example, the energy source can include (without limitation) kinetic energy, electric fields, magnetic fields, and so on. In some embodiments, the power device 106 can include a battery.

One or more, up to all, of the measurement device 104, power device 106, and wireless communicator 108 can each be implemented on a printed circuit board (PCB) 112, although embodiments of the disclosure are not so limited. One or more, up to all, of the measurement device 104, power device 106, and wireless communicator 108 can each be implemented in an integrated circuit (i.e., chip) that is mounted onto the printed circuit board 112. The at least one sensing element 102, printed circuit board 112, and antenna 110 can all be supported by the anatomical implant 200 (shown in FIG. 1), which in turn can be attached to an anatomical body of the patient.

The external wireless reader 116 is configured to wirelessly receive the measurement value from the at least one sensor 100 through the skin of the patient when the external wireless reader 116 is situated outside of the patient's body. Moreover, in at least some examples, the external wireless reader 116 can be configured to wirelessly provide a source of power to the at least one sensor 100. In at least one such example, the external wireless reader 116 can be implemented as an RFID reader.

The external wireless reader 116 can include an antenna 118 and a wireless communicator 120. The wireless communicator 120 can include a transmitter and a receiver. In such examples, the communicator 120 can be considered to be a transceiver. In at least some examples, the external wireless reader 116 can further include a computing device 122. The computing device 122 can be configured to calculate a value of the anatomical property based on the measurement value. In one example, the computing device 122 can calculate the value of the anatomical property by multiplying the measurement value by a specified constant. Alternatively, the system can comprise a computing device 30 as shown in FIG. 1 that is implemented separately from the external wireless reader 116. For example, the computing device 30 can be a computer configured to receive the measurement value from the external wireless reader 116 and present the value to a physician.

Turning now to FIGS. 3 to 8, examples of the anatomical implant 200 of FIG. 1 are shown. In each example, the implant 200 is a bone plate. However, as discussed above, implants of this disclosure may alternatively be any other suitable anatomical implant. It will be understood that the following description of various features of the implant 200 of FIGS. 3 to 5 also applies to the features of implant 200 of FIGS. 6 to 8 that have like reference numerals.

The implant 200 has an implant body 201 that has an outer surface 202. The implant body 201 can be formed from a metal or other material as discussed above. The outer surface 202 can be configured to face away from the bone when the implant 202 is implanted into a patient. The implant body 201 can have an inner surface 204. The inner surface 204 can be configured to face the bone when the implant 202 is implanted into a patient. In some examples, the inner surface 204 can be curved so as to conform to a surface of the bone. In alternative examples, such as when the implant is an intramedullary nail, the implant can have an inner surface, such as an inner surface that defines a cannulation, but the implant need not have an inner surface.

The anatomical implant 200 is configured to be attached to an anatomical structure, such as bone, using any suitable attachment. For example, the implant 200 can define at least one such as a plurality of bone anchor fixation holes 216 therethrough, wherein each bone anchor fixation hole 216 is configured to receive a fastener so as to affix the implant 200 to an anatomical structure such as a bone.

The implant 200 comprises a rim 212 that extends along an outward direction $D_O$ from the body 201 of the implant 200. The rim 212 can be formed from a metal. The rim 212 defines a pocket 214 that extends therein along an inward direction $D_I$, opposite the outward direction $D_O$. The pocket 214 is configured to support at least a portion of a sensor therein. The pocket 214 is bounded by the rim 212. The rim 212 is configured such that a cap 300 (shown in FIGS. 9 to 11) can be attached, such as laser welded, thereto so as to hermetically seal the pocket 214. In some examples, the cap 300 can be formed from a ceramic or other material that provides little, if any, interference with RF signals. The pocket 214 can be open at the outer surface 202 when the cap 300 is not attached thereto and can terminate at an interior surface 208 of the implant 200. The interior surface 208 can define a floor of the pocket 214. The rim 212 can define a closed shape in a plane that is perpendicular to the inward direction $D_I$. For example, the rim 212 can define a rectangular shape as shown in FIGS. 3 to 5, a circular shape as shown in FIGS. 6 to 8, or any other suitable shape. The rim 212 can be integral and monolithic with the body 201. For example, the rim 212 and body 201 can be machined from a single monolithic piece of material. Alternatively, the rim 212 can be attached, such as adhered or welded, to the body 201. However, machining the rim 212 can be advantageous over adhering or welding the rim 212 to the body because adhering might not form a hermetic seal and welding could compromise the strength of the body 201.

The rim 212 has a first end 212a at the implant body 201 and a second end 212b that is spaced from the implant body 201. The second end 212b is a free end that is not attached to the implant body 201. The first end 212a is preferably integral and monolithic with the body 201, although in alterative examples, it can be attached to the body 201. The rim 212 has an internal rim surface 212d and an external rim surface 212c that are opposite one another. The internal rim surface 212d can define the pocket 214. The external rim surface 212c can face away from the pocket 214. The rim 212 can have a thickness t from the interior rim surface 212 to the external rim surface 212c that is less than a dimension (such as a length and/or width) of the rim 212 in a plane that is perpendicular to the inward direction $D_I$. In some examples, the thickness t can be less than a height of the rim 212 along the outward direction $D_O$.

The implant 200 defines a recess 206 that extends into the outer surface 202 along the inward direction $D_I$. The recess 206 can extend to the interior surface 208 of the implant. The interior surface 208 can define a floor of the recess 206. The implant 200 can comprise an edge 210 at the outer surface 202 that defines an outer perimeter of the recess 206. In some examples, the outer perimeter can define a closed shape in a plane that is perpendicular to the inward direction. For example, the outer perimeter of the recess 206 can define a rectangular shape as shown, a circular shape, or another other suitable shape. The recess 206 can be open at the outer surface 202 and can terminate at the interior surface 208. The interior surface 208 can define a floor of the recess 206.

In some examples, the rim 212 can extend from the interior surface 208 along the outward direction $D_O$. The rim 212 can be disposed within the recess 206. The rim 212 can be inwardly spaced from the edge 210 of the recess 206 along a plane that is perpendicular to the outward direction $D_O$ so as to define a space between the rim 212 and the edge 210 of the recess 206. The space can extend entirely around the rim 212. The external surface 212c of the rim 212 can face the edge 210 of the recess 206. It will be understood that, in alternative examples, the implant body 201 can be devoid of the recess 206, and the rim 212 can extend from the outer surface 202 of the implant body 201.

Figure 9:
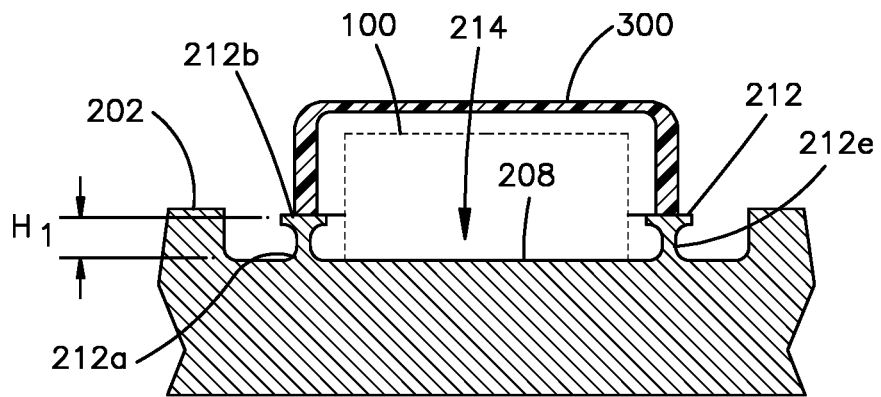
FIG. 9 shows a cross-sectional view of the implant of FIG. 3 or 6 according to another example with a cap attached to a rim of the implant and a sensor disposed within the rim, the rim having a first height.
Figure 10:
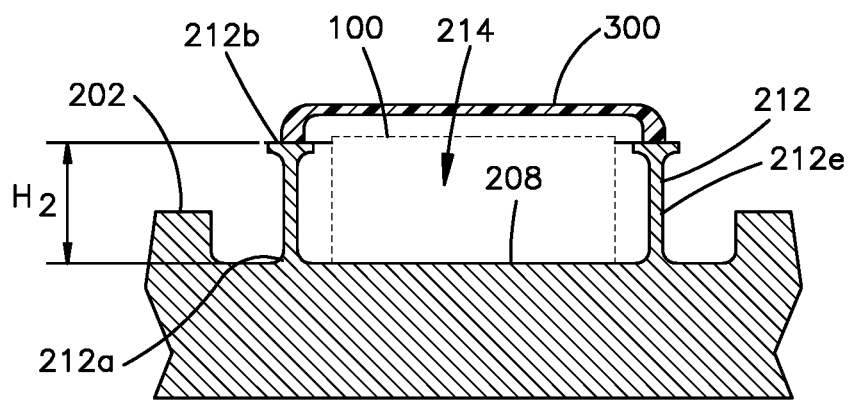
FIG. 10 shows a cross-sectional view of the implant of FIG. 3 or 6 according to another example with a cap attached to a rim of the implant and a sensor disposed within the rim, the rim having a second height.
Figure 11:
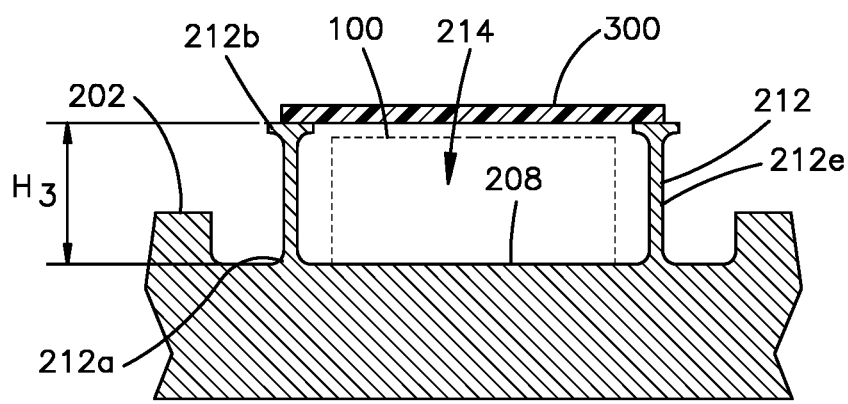
FIG. 11 shows a cross-sectional view of the implant of FIG. 3 or 6 according to another example with a cap attached to a rim of the implant and a sensor disposed within the rim, the rim having a third height.

Turning to FIGS. 9 to 11, the rim 212 is configured to support at least a portion of the sensor 100 therein. In some examples, as shown in FIGS. 9 and 10, the pocket 214 within the rim 212 can support a portion of the sensor 100 therein, and the cap 300 can be configured to support another portion of the sensor 100 therein. In such examples, the rim 212 can have a height as measured from the interior surface 208 to the free end 212b of the rim 212 along the outward direction $D_O$ that is less than a height of the sensor 100 when the sensor 100 is mounted to the implant 200. For example, the rim 212 can have a height $H_1$ that is less than or equal to a distance from the interior surface 208 to the outer surface 202 as shown in FIG. 9. As another example, the rim 212 can have a height $H_2$ that is greater than a distance from the interior surface 208 to the outer surface 202 as shown in FIG. 10, and yet less than a height of the sensor 100.

Figure 12:
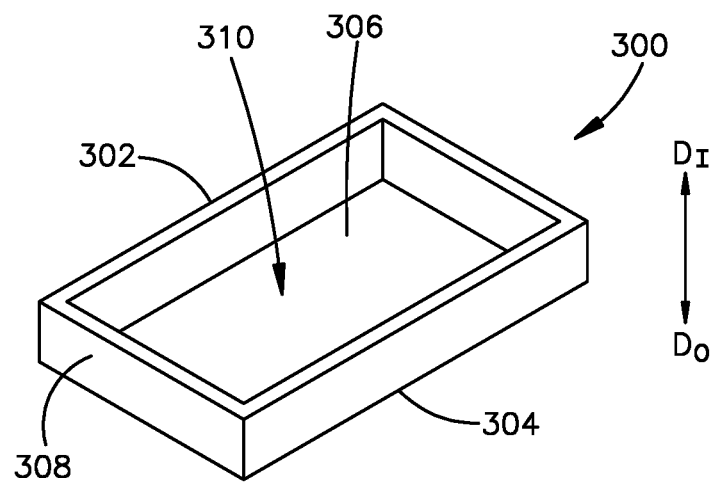
FIG. 12 shows a perspective view of a cap according to one example that can implement the cap of FIG. 9 or 10.

With specific reference to FIG. 12, in examples in which the cap 300 supports a portion of the sensor 100 therein, the cap 300 can define a recess 310 that is configured to support the portion of the sensor 100 therein. The cap 300 can have a first end 302, and a second end 304 that is opposite the first end 302 along the outward direction $D_O$. The second end 304 can include a top wall 306. The cap 300 can have at least one sidewall 308 that extends from the top wall 306 along the inward direction $D_I$. The at least one sidewall 308 can define the recess 310. The recess 310 can extend into the first end 302 of the cap 300 towards the top wall 306 along the outward direction $D_O$. The recess 310 can be configured to support a portion of the sensor 100 therein. The at least one sidewall 308 can enclose the recess 310. For example, the at least one sidewall 308 can define a closed shape around the recess 310 along a plane that is perpendicular to the outward direction $D_O$. The closed shape can be a rectangle as shown in FIG. 12, a circle, or any other suitable shape. Thus, the cap 300 can have a shape of a box that is open at one end, a cylinder that is open at one end, or another suitable three-dimensional shape that is open at one end. The at least one sidewall 308 can have a cross-sectional shape that conforms to a shape of the free end 212b of the rim 212 such that the at least one sidewall 308 is configured to be hermetically sealed to the rim 212.

Referring to FIG. 11, in some examples, the pocket 214 can support an entirety of the sensor 100 therein, and the cap 300 is configured to close the pocket 214 without supporting any portion of the sensor 100 therein. The cap 300 can define a recess therein as discussed above or can be devoid of a recess as shown in FIG. 11. In some examples, the cap 300 can have a planar shape. In some such examples, the cap 300 can have a cross-sectional shape along a plane that is perpendicular to the outward direction $D_O$ that is rectangular, circular, or any other suitable shape. The cap 300 can have a cross-sectional shape that conforms to a shape of the free end 212b of the rim 212 such that the cap 300 is configured to be hermetically sealed to the rim 212.

With reference to FIGS. 9 to 11, in some examples, the rim 212 can have a narrowed portion 212e between the first and second ends 212a and 212b of the rim 212. The narrowed portion 212e can have a thickness along a direction that extends from the internal rim surface 212d to the external rim surface 212c that is less than a thickness of the first and second ends 212a and 212b along the same direction. The narrowed portion 212e can allow flexibility of the rim 212.

Figure 13:
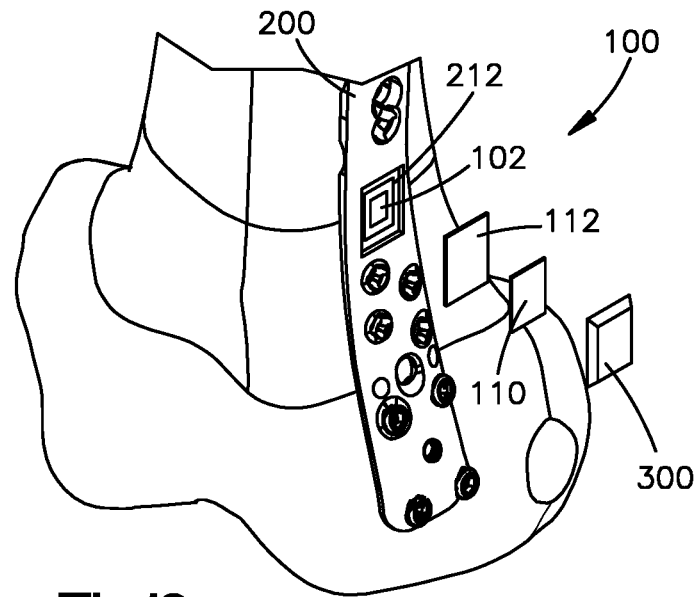
FIG. 13 shows a partially-exploded perspective view of an implantable sensor system that comprises an anatomical implant, a sensor, and a sensor cover.

Turning now to FIG. 13, an example of an implantable sensor system is shown. The system comprises an anatomical implant 200 and at least one implantable sensor 100. The anatomical implant 200 can be implemented as discussed above in relation to implant 200. The sensor 100 can comprise at least one sensing element 102, a printed circuit board 112, and an antenna 110. Further, the system can comprise a cover 300. It will be understood that sensors 100a and 100b can each be implemented as shown in FIG. 9. In one example, the at least one sensing element 102 can be part of a strain gauge. The strain gauge can be supported by the body 201 of the implant 200 such that the strain gauge 200 is in direct contact with the implant body 201. In some examples, the at least one sensing element 102 can include more than one sensing element 102 supported by the implant body 201. The sensing elements 102 can be angularly offset from one another so as to detect one or both of torsional and bending forces imparted by the bone on the implant 200.

The printed circuit board 112 can include a substrate. One or more integrated circuits can be mounted onto the substrate. Further, the printed circuit board 112 can be configured as described above in relation to printed circuit board 112. For example, the one or more integrated circuits can include an integrated circuit comprising the power device 106, an integrated circuit comprising the measurement device 104, and an integrated circuit comprising the wireless communicator 108. In at least one embodiment, the integrated circuit comprising the power device 106 can be implemented as an energy harvesting chip, the integrated circuit comprising the measurement device 104 can be implemented as a PicoStrain® chip, and the integrated circuit comprising the wireless communicator 108 can be implemented as an RFID chip.

When each of the at least one sensor 100 is assembled, the at least one sensing element 102, the printed circuit board 112, and the antenna 110 can be aligned along the outward direction $D_O$ of the implant 200. For example, the printed circuit board 112 can be disposed between the at least one sensing element 102 and the antenna 110.

The cover 300 can be aligned with the at least one sensing element 102, the printed circuit board 112, and the antenna 110 along the outward direction $D_O$. Thus, the antenna 110 can be disposed between the printed circuit board 112 and at least a portion of the cover 300, such as the top wall 306 of the cover 300, with respect to the outward direction $D_O$. In the assembled configuration, each sensor 100 can have an overall size in a plane perpendicular to the select direction between approximately 8 mm×8 mm and approximately 20 mm×20 mm, and increments of 1 mm therebetween. In one example, each sensor 100 can have an overall size in the plane of approximately 12 mm×12 mm. Each sensor 100 can further have an overall thickness in the select direction between approximately 2 mm and 4 mm, although in alternative examples the thickness can be below 2 mm or above 4 mm.

To assemble the implantable sensor system, the sensor 100 is inserted into the pocket 214 of the implant 200. The pocket 214 is then hermetically sealed by attaching the cap 300 onto the rim 212 of the implant 200. In one example, the attaching step can comprise welding, such as laser welding, the cap 300 to the rim 212. When welding the cap 300 to the rim 212, heat generated by the welding is absorbed by the rim 212, thereby protecting the implant body 201 from damage or weakening. This way the sensor 100 is hermetically sealed with the cap 300, which allows for RF communication, while the load-bearing part of the implant (i.e., the implant body 201) is shielded from the excessive heat generated by the laser welding process.

It should be noted that the illustrations and descriptions of the examples shown in the figures are for exemplary purposes only, and should not be construed limiting the disclosure. One skilled in the art will appreciate that the present disclosure contemplates various examples. Additionally, it should be understood that the concepts described above with the above-described examples may be employed alone or in combination with any of the other examples described above. It should further be appreciated that the various alternative examples described above with respect to one illustrated example can apply to all examples as described herein, unless otherwise indicated.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more examples or that one or more examples necessarily include these features, elements and/or steps. The terms "comprising," "including," "having," and the like are synonymous and are used inclusively, in an open-ended fashion, and do not exclude additional elements, features, acts, operations, and so forth.

While certain examples have been described, these examples have been presented by way of example only and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions, and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

It will be understood that reference herein to "a" or "one" to describe a feature such as a component or step does not foreclose additional features or multiples of the feature. For instance, reference to a device having or defining "one" of a feature does not preclude the device from having or defining more than one of the feature, as long as the device has or defines at least one of the feature. Similarly, reference herein to "one of" a plurality of features does not foreclose the invention from including two or more, up to all, of the features. For instance, reference to a device having or defining "one of a X and Y" does not foreclose the device from having both the X and Y.

What is claimed is:

1. An anatomical implant, comprising:
   an implant body having an inner surface configured to face bone, and an outer surface opposite the inner surface in an outward direction; and
   a rim that extends from the outer surface in the outward direction, the rim having an internal surface, and an external surface opposite the internal surface, the internal surface defining a pocket having a closed end defined by a floor of the implant body, the floor disposed between the inner surface and the outer surface, wherein the rim defines an opening to the pocket that is opposite the floor in the outward direction, and the pocket is configured to support a sensor therein.

2. The anatomical implant of claim 1, wherein the rim comprises a first end that is attached to the implant body, and a second end opposite the first end, the second end being a free end that is free from connection to the implant body.

3. The anatomical implant of claim 2, wherein the rim has a narrowed portion between the first and second ends, the narrowed portion having a thickness that is less than a thickness of the first and second ends.

4. The anatomical implant of claim 1, wherein the rim defines a closed shape around the pocket in a plane that is perpendicular to the outward direction.

5. The anatomical implant of claim 1, wherein the anatomical implant defines a recess that extends into the outer surface to an interior surface of the implant that defines a floor of the recess, and the rim extends from the interior surface within the recess along the outward direction.

6. The anatomical implant of claim 5, wherein the anatomical implant comprises an edge at the outer surface that defines an outer perimeter of the recess, and rim is inwardly spaced from the edge so as to so as to define a space between the rim and the edge.

7. The anatomical implant of claim 6, wherein the edge defines a closed shape around the rim in a plane that is perpendicular to the outward direction, and the space between the rim and the edge extends entirely around the rim.

8. The anatomical implant or claim 5, wherein the rim has a height from the interior surface along the outward direction that is less than or equal to a distance from the interior surface to the outer surface along the outward direction.

9. The anatomical implant of claim 5, wherein the rim has a height from the interior surface along the outward direction that is greater than a distance from the interior surface to the outer surface along the outward direction.

10. A system comprising:
    the anatomical implant of claim 1; and
    a cap configured to be attached to the rim so as to hermetically seal the pocket.

11. The system of claim 10, wherein the rim is formed of metal and the cap is formed of ceramic.

12. The system of claim 10, wherein the cap is attached to the rim.

13. The system of claim 10, comprising a sensor configured to be disposed in the pocket.

14. The system of claim 13, wherein pocket is configured to support a portion of the sensor therein, and the cap defines a recess configured to support another portion of the sensor therein.

15. The system of claim 13, wherein the pocket is configured to support an entirety of the sensor therein, and the cap is configured to close the pocket without supporting any portion of the sensor therein.

16. The system of claim 13, wherein the sensor comprises at least one sensing element and a wireless communicator configured to wirelessly communicate a signal sensed by the at least one sensing element.

17. The anatomical implant of claim 1, wherein the rim extends from the implant body to a free end, the internal surface of the rim is spaced from the external surface of the rim along an inward direction, and the internal surface at the free end is offset in the inward direction from the internal surface of the rim between the free end and the implant body.

18. The anatomical implant of claim 1, comprising a bone plate having a plurality of bone anchor fixation holes that extend from the inner surface to the outer surface, each configured to receive a fastener so as to affix the bone plate to bone.

19. A system comprising:
the anatomical implant of claim 18; and
the sensor disposed in the pocket.

* * * * *